United States Patent [19]

Yen

[11] Patent Number: 4,906,259

[45] Date of Patent: Mar. 6, 1990

[54] PREFILTER FOR VACUUM CLEANERS

[76] Inventor: Richard C. K. Yen, 4261 Chase Ave., Los Angeles, Calif. 90066

[21] Appl. No.: 335,876

[22] Filed: Apr. 10, 1989

[51] Int. Cl.$^4$ .............................................. B01D 46/04
[52] U.S. Cl. .......................................... 55/96; 55/343; 55/344; 55/361; 55/470; 55/473; 55/DIG. 3
[58] Field of Search ...................... 55/96, 97, 291, 301, 55/343, 344, 350, 361, 372, 467, 470, 473, DIG. 2, DIG. 3

[56] References Cited

U.S. PATENT DOCUMENTS

4,735,639  4/1988  Johnstone .................. 55/DIG. 3 X

Primary Examiner—Charles Hart
Attorney, Agent, or Firm—Thomas I. Rozsa

[57] ABSTRACT

A pre-filter apparatus for use in conjunction with a vacuum cleaner, and which is used to pre-filter the dirt and dust-filled air by a method of negative pressure filtration in order to substantially reduce the volume of air suspending the same amount of dirt before it enters the vacuum cleaner bag, and to continously self-clean the pre-filter. The result is to obtain air without small, filter-clogging particulates by first aggregating them into larger particles before they get to the vacuum cleaner bag so that what enters the vacuum cleaner bag are big clumps which would not have many small particles that can effectively clog up the filter bag. The invention includes the concept of having a smaller suction force siphon off some air through various pre-filter membranes while a larger suction force pulls the dirt particles away from the pre-filter membranes by a negative pressure to keep them continuously clean and maintain their filtration efficiency.

12 Claims, 2 Drawing Sheets

PREFILTER FOR VACUUM CLEANERS

BACKGROUND OF THE INVENTION

1. FIELD OF THE INVENTION

The present invention relates to pre-filtering apparatus which are used to pre-filter air before the air is used for its intended purpose. The field of the present invention specifically relates to vacuum cleaners and an apparatus for pre-filtering air and concentrating and aggregating the dirt before it is either blown or sucked into the vacuum cleaner bag for the purpose of trapping dirt inside the vacuum cleaner bag.

2. DESCRIPTION OF THE PRIOR ART

A vacuum cleaner is an appliance, usually run on electricity, which is used for cleaning surfaces such as floors, carpets, tapestry or upholstered work, by cleaning means which involve suction. A modern vacuum cleaner develops its suction by means of a fan which discharges a powerful stream of air from the rear end of the casing. This sets up a powerful inflowing current of air which carries along any dust particles from the carpet or floor to which the suction nozzle is applied. The fan is usually driven by a small high-speed universal motor. A universal motor can be work on either alternating current or direct current. The fan has a large number of blades set at an angle. Their rotation sets up a flow of air in the axial direction. The air stream is passed through a filter in which the dust is precipitated and collected. In conventional bag type vacuum cleaners, the air is inhaled through a suction nozzle which picks up dirt and dust from a surface such as a carpet. A sufficiently powerful airflow to carry along dust and grit particles must be set up. Such air flow is induced by the suction developed by the fan. The air passes through a flap valve and into the filter bag and from there it exits the filter bag via tiny pores in the filter bag and is blown out of the rear end or other exit opening; the dust and dirt thereby being trapped in the bag. The fan and motor can be located ahead of or behind the bag.

A significant problem with prior art bag collection type vacuum cleaners is that the effective suction power gradually diminishes because of the increasing air flow resistance as the tiny pores of the filter bag becomes obstructed with dust particles.

One improvement known in the prior art is used in good quality hand held vacuum cleaners. These units have a small dust collecting chamber ahead of the filter.

Figure 1:
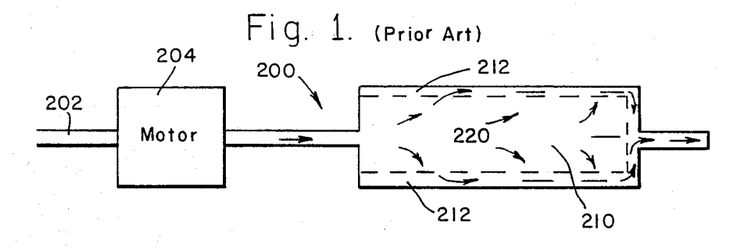
FIG. 1 is a schematic flow diagram of prior art conventional positive pressure vacuum cleaner systems.

In general, the problem with prior art bag type vacuum cleaners is illustrated in FIG. 1. For purposes of the present discussion, the key elements of prior art positive pressure bag filter vacuum cleaners are illustrated at 200. The air from the surface to be cleaned is sucked into the vacuum cleaner through air intake 202 and pushed by the motor 204 and its fan into the filter bag 210. The bag 210 comprises at least one filter membrane or filter bag 212. The air flow 220 is blown onto the surface of the filter membrane 212 and therefore the dust and dirt sucked in through air intake 202 is also blown onto the surface of the filter membrane 212 through the positive pressure of the air 220 being pushed onto the filter membrane 212. Positive pressure is defined as pressure in the direction of the retention surface of a filter membrane or filter bag, pressing particular matters onto the retention surface, resulting in obstruction of the pores of the filter membrane or bag. The retention surface is defined as that surface of one filter membrane or bag that faces the particulate matters and that which faces away from the clean, filtered air. As a result of this positive pressure flow of air 220 onto the surface of the filter membrane 212, particulate matters are trapped within the matrix of the filter membrane 212 and quickly diminishes the cleaning capability of the vacuum cleaner.

Therefore, a significant need exists to eliminate the problem of the clogging of filter membranes or filter bags within vacuum cleaners to thereby prolong the suction capability of the vacuum cleaner.

SUMMARY OF THE PRESENT INVENTION

The present invention is a pre-filter apparatus for use in conjunction with a vacuum cleaner, and which is used to pre-filter the dirt and dust-filled air by a method of negative pressure filtration in order to substantially decrease the volume of the air and to allow small dirt particles to aggregate into large particles before they enter the vacuum cleaner bag. The result is to obtain a small volume of air containing big clumps too large to effectively clog the pores in the vacuum cleaner filter bag. Clogging of a filter requires particulate matters of sizes comparable to the effective pore sizes of the filter. Particulates substantially smaller than the pores will pass through the pores without clogging them. Particles several orders of magnitudes larger than the pores also cannot form tight seals with the pores, thus allowing air to pass through. Therefore a substantial aggregation of dirt particles before they arrive at the filter bag will diminish the extent of clogging of the filter bag.

Most prior art pre-filters have pore size of the pre-filters larger than the pore size of the main filters, in order to screen out larger particles before they arrive at the main filters, so that only smaller particles more suitable for the main filters to perform the filtration can be presented to the main filter membrane surface. Also, the volume of filtrate passing through the conventional prefilters per minute are usually identical to the volume of filtrate passing through the main filter per minute. In contrast, the present invention of a pre-filter unit utilizes completely different principles. The pore size of the pre-filter membranes can be larger, similar or smaller compared to the pore size of the main filters (such as the filter bag of the vacuum cleaner). In addition, the present pre-filter does not trap any particles of whatever sizes. A critical concept here is that the pre-filter membranes remain unclogged at all times while allowing a portion of air to go through the pre-filter pores, thus achieving the desirable purposes of (1) a long useful life of the pre-filter without constantly having to change or discard of the pre-filter; (2) a high undiminished efficiency of removing air from the intake volume (amount of dirt-filled air sucked in by vacuum cleaner); (3) decreasing the volume of air (per minute) presented to the vacuum filter bag without decreasing the intake volume (per minute) that the vacuum cleaner nozzle is capable of sucking in; (4) promoting aggregation of small dirt particles during transit through the pre-filter unit before they arrive at the vacuum filter bag. The invention includes the concept of having a smaller suction force siphon off a portion of air out of the pre-filter membranes while a larger suction force pulls the larger dirt particles away from the pre-filter membranes by a negative pressure away from the pre-filter membranes to prevent clogging of the pre-filter membranes themselves.

The pre-filter of the present invention also comprises filter membrane surfaces. The critical concept of the present invention pre-filter is that instead of using positive pressure to push the dirty air onto the surface of the filter membrane in the pre-filter, the present invention device employs a negative pressure to pull the larger particulate matter away from the surface of the pre-filter membrane. The definition of positive pressure is hereby defined as pressure forcing the air and the dirt therein toward the retention surface of the filter for the particulate matters. The retention surface is that surface of the filter which faces the air flow coming at it and which faces away from the clean filtered air. By this definition, conventional vacuum cleaner systems using a negative suction from a motor and fan downstream from the filter bag in fact also applies a positive pressure on the filter bag directing the dirty air onto the filter retention surface. The present invention pre-filter is truly anti-clogging and is novel because it is designed to actually pull particulate matters away from the retention surface of the filter membranes of the pre-filter. Two suctional sources are in operation at all times on the filter membrane surfaces. The weaker suctional source is designed to siphon air out of the pre-filter unit but it tends to push dirt onto the retention surface of the pre-filter membrane. The stronger suctional source sucks air in the opposite direction (negative pressure) which tends to unclog the pre-filter membrane. By preventing the pre-filter membrane from being clogged, the pre-filter unit can continuously extract with undiminished efficiency, clean air from dust-filled air, resulting in the same amount of dust distributed in a smaller volume of air, which leads to clumping of small dust particles into large aggregates. As a result of forming large aggregates, the dirt and dust particles cannot effectively clog the main vacuum cleaner bag.

This design is able to keep the pre-filter clean because negative pressures on particulate matters are always greater than the positive pressures moving them towards any part of the pre-filter retention surfaces. Consider the simple case of any single pre-filter pore, X, located at any part of the pre-filter membrane. Two sources of suctions are working against each other at X. The positive pressure siphoning some air away from the pre-filter tends to push the dirt onto the retention surface. However, the negative pressure pulling the dirt away from the retention surface is usually stronger. During temporary disequilibrium of pressure sometimes the positive pressure at X may exceed that of the negative pressure created by the pulling force of the main vacuum cleaner fan. The resultant net positive pressure will cause pore X to be temporarily clogged. However, when pore X is clogged, the positive pressure created by the pre-filter vacuum source will decrease at X to zero, because flow rate there becomes zero. (Flow rate is equal to pressure divided by resistance. When X is obstructed, resistance at X becomes infinitely large and so the pressure in the direction of the flow of fluid becomes zero). Since the negative pressure at X created by the pulling force of the main vacuum pump remains unchanged, a decrease of positive pressure at X to zero will allow an increasingly larger net negative pressure to unclog again the particulate matters temporarily obstructing X.

It has been discovered, according to the present invention, that if a pre-filter unit which aggregates small particulate matter which can clog a filter membrane is used to pre-filter incoming dirty air before the air reaches the main vacuum cleaner bag, the only air reaching the main vacuum cleaner bag will contain very large clumps of dirt which will be retained within the vacuum cleaner bag but which are too large to be trapped within the vacuum cleaner bag filter pores, thereby significantly reducing the clogging of the filter pores and prolonging the useful life of the vacuum cleaner filter bag. Since the filter bag is less clogged,d the suction power of the vacuum cleaner apparatus will not be greatly diminished like conventional prior art which will have increased resistance to air flow through the pores of the filter bag from clogging of the filter bag pores.

It has further been discovered, according to the present invention, that if the pre-filter unit comprises a multiplicity of sub-pre-filter units through which the dirty air is pre-filtered, the air finally entering the vacuum cleaner bag will have most of the small, filter-clogging particulate matter aggregated already and only the largest non-filter-clogging clumps will remain in the air which enters the main vacuum cleaner bag.

It has additionally been discovered, according to the present invention, that if a weaker motor is used to pull air through a pre-filter (exerting a weak positive pressure on the pre-filter membrane tending to clog it) while a stronger motor is used to suck the remaining particulates away from the pre-filter unit memberane (exerting a larger anti-clogging negative pressure on the same pre-filter membrane), the filter membrane pores of the pre-filter will remain unclogged. All dirt particles will be pulled away from the filter membrane units of the pre-filter and eventually be aggregated into larger clumps and be sucked into the main vacuum cleaner bag.

It is therefore an object of the present invention to provide an apparatus which will pre-filter the dirty air and thereby decrease its volume, and concentrate its dirty content, and result in aggregation of the small particulate matter from incoming dirty air before it is sucked into the main vacuum cleaner bag, to thereby substantially reduce the amount of filter-clogging material that will be sucked into the main vacuum cleaner bag and substantially reduce the clogging of the vacuum cleaner bag.

It is another object of the present invention to provide a pre-filter apparatus which comprises a multiplicity of sub-pre-filter units to provide multiple pre-filter membranes through which pores the clean air will pass, resulting in an increase in the concentration of small filter clogging particulate matters which will aggregate in the remaining volume of dirty air. Such aggregates will be pulled away from the filter membranes of the pre-filter unit by a larger negative force provided by the vacuum cleaner fan.

It is a further object of the present invention to provide a simple detachable pre-filter unit which does not require frequent changing and cleaning and which can be easily attached onto conventional vacuum cleaner units or be incorporated into conventional vacuum cleaner systems.

Further novel features and other objects of the present invention will become apparent from the following detailed description, discussion and the appended claims, taken in conjunction with the drawings.

DRAWING SUMMARY

Referring to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 2:
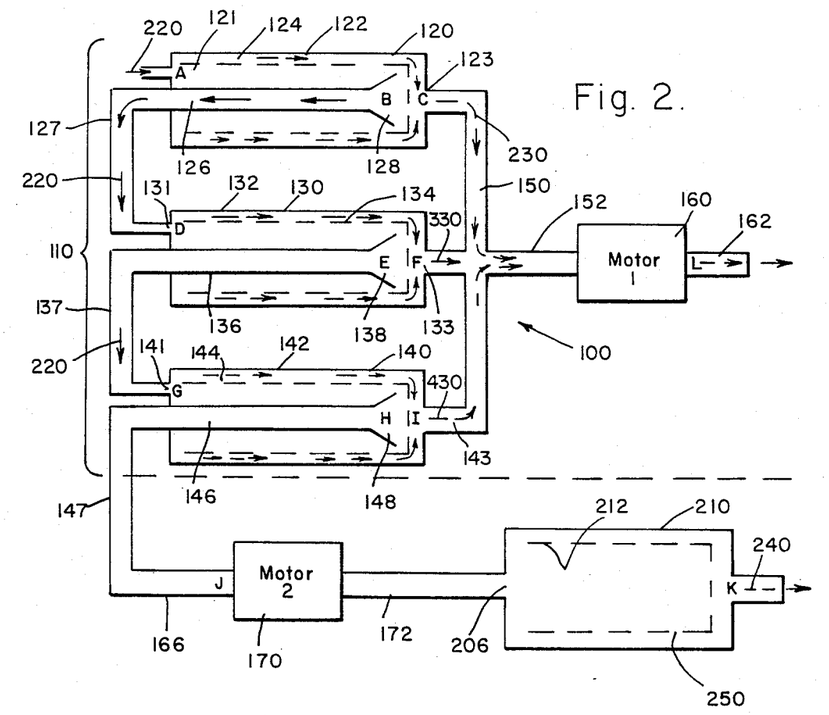
FIG. 2 is a schematic flow diagram of the present invention pre-filter apparatus, illustrating the principles of the negative pressure pre-filter units incorporated into a conventional positive pressure vacuum cleaner system.

Referring particularly to FIG. 2, there is illustrated at 100 a schematic flow diagram of the present invention pre-filter apparatus, illustrating the principles of the negative pressure pre-filter units incorporated into a conventional positive pressure vacuum cleaner system. The pre-filter unit 110 comprises three sub-pre-filter units 120, 130 and 140. It will be appreciated that the selection of three sub-pre-filter units is merely a matter of design choice and the present invention includes within it any number of such sub-pre-filter units from at least one to several hundred. First sub-pre-filter unit 120 comprises a filter housing 122 having within it at least one pre-filter membrane 124. The housing 122 further comprises a dirty-air inlet opening 121 and a clean-air exit opening 123. Located within housing 122 and preferably disposed along the longitudinal centerline of housing 122 is dirty air passage tube 126 having throat opening 128 preferably located near outlet opening 123. Second sub-pre-filter unit 130 comprises a filter housing 132 having within it at least one pre-filter membrane 134. The housing 132 further comprises a dirty-air inlet opening 1321 and a clean-air exit opening 133. Located within housing 132 and preferably disposed along the longitudinal centerline of housing 132 is dirty air passage tube 136 having throat opening 138 preferably located near outlet opening 133. Third sub-pre-filter unit 140 comprises a filter housing 142 having within it at least one pre-filter membrane 144. The housing 142 further comprises a dirty-air inlet opening 141 and a clean-air exit opening 143. Located within housing 142 and preferably disposed along the longitudinal centerline of housing 142 is dirty air passage tube 146 having throat opening 148 preferably located near outlet opening 143. Dirty air passage tube 126 extends through connector tube 127 into air inlet 131 and dirty air passage tube 136 extends through connector tube 137 into air inlet 141. The three clean air exit openings 123, 133 and 143 are joined through openings connector tube 150 into a single clean air exit passage 152. Clean air exit passage 152 leads to first motor 160 which discharges the clean air through clean air exit 162 into the atmosphere. Dirty air passage tube 146 extends through connector tube 147 into dirty air exit passage 166 which leads to second motor 170 which discharges the air through dirty air exit 172 which in turn leads to inlet opening 206 of conventional vacuum cleaner bag housing 210 which contains conventional vacuum cleaner filter membrane 212.

In operation, it is preferred that second motor 170 be substantially more powerful than first motor 160. By way of example only, second motor 170 can be in the range from approximately two horsepower to approximately ten horsepower. By way of example only, first motor 160 can be in the range from approximately one horsepower to approximately four horsepower. Dirty air 220 which includes both large and small clumps of dirt and dust is sucked into first dirty-air inlet opening 121 of first sub-pre-filter unit 120 by the combined suction of first motor 160 and second motor 170. A small percentage of the air is pulled through the pores of the pre-filter membrane 124 to become clean air 230 which exits through clean-air outlet opening 123 from the suction of first motor 160. The dirty air 220 including large particulates and some small particulates is pulled by the greater suction of more powerful second motor 170 into throat 128 and through dirty air passage tube 126 and along connector tube 127 into inlet opening 131 of second sub-pre-filter unit 130. Because the negative pressure exerted by motor 170 is greater than the positive pressure created by motor 160, any small dirt particles obstructing a member pore of pre-filter membrane 124 will be pulled back again away from the retention surface (facing the dirty air) and result in the same pore being unclogged again. An additional small percentage of the air is again pulled through filter membrane 134 to become clean air 330 which exits through clean-air outlet opening 133 from the suction of first motor 160. The dirty air 220 including the large particulates and some small particulates is pulled by the greater suction of more powerful second motor 170 into throat 138 and through dirty air passage tube 136 and along connector tube 137 into inlet opening 141 of third sub-pre-filter unit 140. Again, because motor 170 is more powerful than motor 160, the pre-filter membrane pores of membrane 134 will remain clean and unclogged. An additional small percentage of the air is pulled through pre-filter membrane 144 to become clean air 430 which exits through clean-air outlet opening 143 from the suction of first motor 160. The dirty air 220 including the large particulates and some small particulates is pulled by the greater suction of more powerful second motor 170 into throat 148 and through dirty air passage tube 146 and along connector tube 147 through passages 166 and 172 and into inlet opening 206 of the vacuum cleaner bag 212. By the time the dirty 220 gets to the vacuum clean bag inlet 206, most of the small particulates in the dirty air have been aggregated into larger clumps because the volume of dirty air suspending the same amount of dirt is progressively smaller as more clean air is sucked out of clean air exit 123, 133, and 143 and the result is that most filter-clogging particulates have become aggregated before entering inlet 206. Air entering inlet 206 contains mostly large particulates and dust which are too large to obstruct the pores 250 of filter bag 212 and instead settle within the interior of vacuum cleaner bag 212. As a result, the filter bag 212 remains clear and clean for a longer period of time, thereby prolonging the undiminished suction power of the vacuum cleaner.

A key concept of the present invention is that the greater power of second motor 170 exerts a greater pulling force away from the the pre-filter membranes 124, 134 and 144 than the positive pulling force onto these pre-filter membranes by less powerful motor 160. Therefore, the pre-filter membranes will not entrap any particulate matters thereby keeping the pre-filter membrane pores clear for additional filtering while the greater negative pressure generated by the more powerful motor 170 pulls the particulates away from the pre-filter membrane so they travel to the next sub-pre-filter unit where again some of the air is sucked out without clogging the pre-filter membrane pores while the particulates are carried to the next pre-filter unit and progressively concentrated. It will be appreciated that the more pre-filter units there are, the better the pre-filtering process of the dirty air and the more concentrated the dirt becomes in the remaining volume of dirty air.

Clean air 162 is exhausted from the exhaust out of first motor 160 into the atmosphere while clean air 240 is exhausted out of the exhaust of second motor 170 into the atmosphere.

Because motor 170 pumps dirty air into filter bag 212 with positive pressure, the pores 250 in filter bag 212 will eventually be clogged. When this happens the filter bag 212 will have to be changed and either cleaned or discarded as conventional vacuum cleaner bags are. The present invention pre-filter unit merely prolongs the useful life of bag 212 and the efficiency of motor 170 (which will be less effective when filter bag 212 becomes clogged) and does not prevent ultimate clogging of the filter bag 212.

It will be appreciated that the flow rate of air is diminished as the air 220 is passed through the various pre-filter units and then through the vacuum cleaner bag assembly. The following locations have been charted: (1) Location A is at the first dirty-air inlet 121 of first sub-pre-filter unit 120. (2) Location B is at the throat 128 of first dirty air passage tube 126. (3) Location C is at clean air outlet opening 123 of first sub-pre-filter unit 120. (4) Location D is at the dirty air inlet 131 of second sub-pre-filter unit 130. (5) Location E is at the throat 138 of second dirty air passage tube 136. (6) Location F is at clean air outlet opening 133 of second sub-pre-filter unit 130. (7) Location G is at the dirty air inlet 141 of third sub-pre-filter unit 140. (5) Location H is at the throat 148 of third dirty air passage tube 146. (6) Location I is at clean air outlet opening 143 of third sub-pre-filter unit 140. (7) Location J is at the entrance to second motor 170. (8) Location K is at the exhaust from second motor 170. (9) Location L is at the exhaust from first motor 160.

It has been experimentally determined as an illustrative example that the following flow rates occur at the locations described above.

| Location | Flow Rate Of Air In Liters Per Minute |
| --- | --- |
| A | 50 |
| B | 40 |
| C | 10 |
| D | 40 |
| E | 30 |
| F | 10 |
| G | 30 |
| H | 20 |
| I | 10 |
| J | 20 |
| K | 20 |
| L | 30 |

It will be appreciated that the negative pressure at B (40 L/min) pulling away from pre-filter membrane 124 is substantially greater than the positive pressure exerted in filtering 10 L/min of air through membrane 124, and exiting through exit connection 230. Similarly at location E, the negative pressure generated by a flow rate of 30 L/min is again greater than the positive pressure created by extracting 10 L/min of clean air. Even at H, the negative pressure (20 L/min) is greater than the positive pressure created by a flow of 10 L/min at I. Such an arrangement is the unique concept of this pre-filter whereby the negative pressures on the retention surface of the pre-filter membranes keep them clean and unobstructed.

Figure 3:
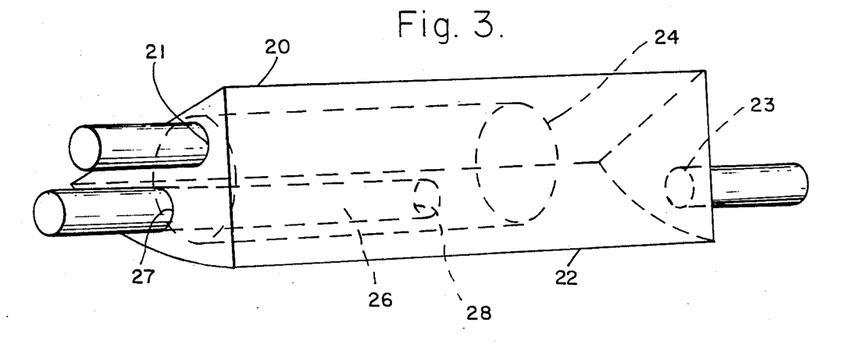
FIG. 3 is a perspective view of a wedge section of one embodiment of a pre-filter unit incorporating the principles of the present invention.

It will be further appreciated that the concept of the present invention as illustrated in the above described apparatus can be incorporated into any multiplicity of embodiments which are within the spirit and scope of the present invention. One such illustrative practical apparatus embodiment will be described below. The concept of this embodiment is to incorporate a multiplicity of sub-pre-filter units, for example 5, into a cylindrical enclosure. To maximize the efficiency of space utilized, each sub-pre-filter unit is in the form of an elongated wedge as illustrated in FIG. 3. First wedge shaped sub-pre-filter unit 20 comprises a housing 22 having within it at least one generally cylindrical filter membrane 24. The housing further comprises a dirty air inlet opening 21 and a clean air exit opening 23. Located within wedge shaped housing 22 and disposed within the filter membrane 24 is dirty air passage tube 26 having an interior throat opening 28. The opposite end of dirty air passage tube 26 extends into connector tube 27 which will extend to the inlet opening of the housing of the next wedge shaped sub-pre-filter unit. The passage of air in the direction of connector tube 27 away from throat opening 28 creates a negative pressure in the direction away from the retention surface of filter membrane 24, thus creating an anti-clogging force. It will be appreciated that that exit opening 23 is connected to the lower horsepower motor while the dirty air passage tube 26 is eventually connected to the greater horsepower motor. A portion of the air entering the inlet opening 21 is sucked through the pre-filter membrane 24 which then exit as clean-air through the clean air outlet opening 23 to the lower horsepower motor while most of the dirty air including the large particulates and some smaller particulates enters through opening 28 and goes through dirty air passage tube 26 and to the inlet of the next sub-pre-filter unit. As explained above, the negative anti-clogging pressure will unclog any clogged pores of pre-filter 24. Eventually the large aggregates of dirt will enter into the vacuum cleaner bag, as previously described.

The pre-filter is always kept clean and unclogged because in contrast to the filter bag of the vacuum cleaner, the pre-filter operates in a truly novel and effective anti-clogging principle, as described above.

Figure 4:
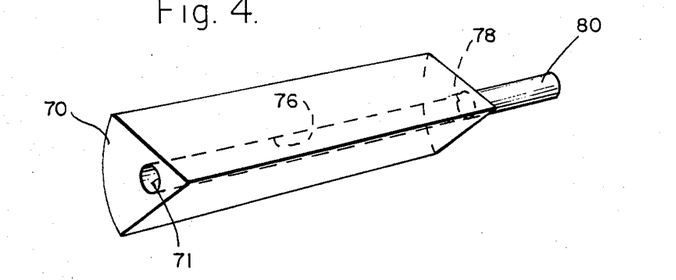
FIG. 4 is a perspective view of another wedge section of one embodiment of a pre-filter unit incorporating the principles of the present invention.
Figure 5:
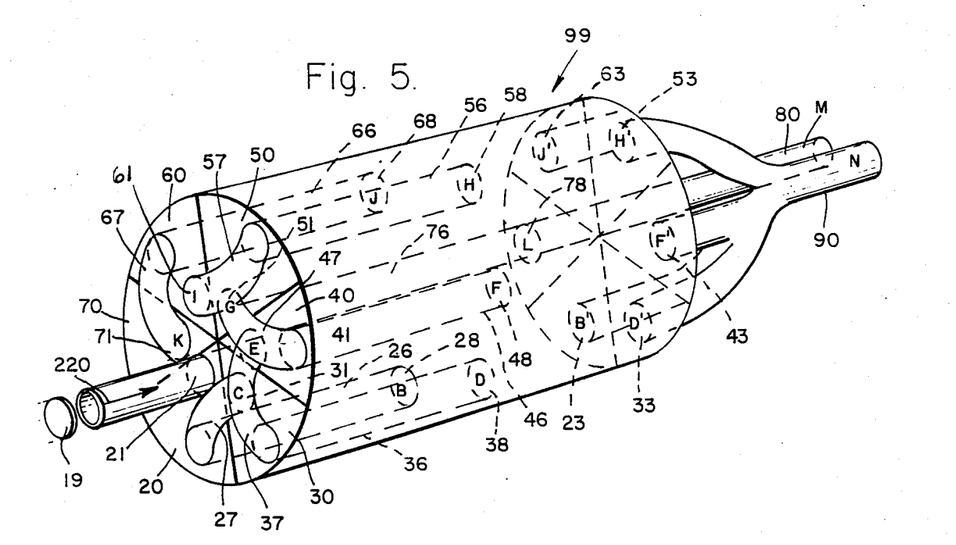
FIG. 5 is a perspective view of one embodiment of a pre-filter unit incorporating the principles of the present invention, including the wedge sections illustrated in FIG. 3 and FIG. 4, with certain interior elements shown in dashed lines.

The present invention pre-filter assembly 99 having five sub-pre-filter units is illustrated in FIG. 5. It will be appreciated that the five units are comparable to the sub-unit illustrated in FIG. 3. The sixth wedge is illustrated in FIG. 4, which does not have any pre-filters and serves as a relay between the fifth sub-pre-filter unit to the vacuum cleaner main motor. In order to make the drawing too complicated and for purposes of clarity, the filter membranes are not illustrated in FIG. 5 but it will be appreciated that in each of the five wedge shaped sub-pre-filter units, the filter membrane is located within the sub-pre-filter unit as illustrated in FIG. 3. As illustrated in FIG. 3 but referring to FIG. 5, first sub-pre-filter unit 20 includes inlet opening 21 into suction tube 19 (coming from the vacuum cleaner inlet opening which sucks air and dirt from the surface to be cleaned) extends. Dirty air 220 enters through inlet opening 21, and a portion is sucked through the pre-filter membrane within sub-pre-filter unit 20 (resulting in clean air to exits at B') and the majority of the air including large dirt particles and some small dirt particles is sucked into throat opening 28 of dirty air passage tube 26 which extends into connector tube 27 which in turn extends into inlet opening 31 of second wedge shaped sub-pre-filter unit 30. Similarly, dirty air 220 enters through inlet opening 31, and a portion is sucked through the pre-filter membrane within sub-pre-filter unit 30 (resulting in clean air which exits at D') and the majority of the air including large dirt particles and some small dirt particles is sucked into throat opening 38 of dirty air passage tube 36 which extends into connector tube 37 which in turn extends into inlet opening 41 of third wedge shaped sub-pre-filter unit 40. Similarly, dirty air 220 enters through inlet opening 41, and a portion is sucked through the pre-filter membrane within sub-pre-filter unit 40 (resulting in clean air which exits at F') and the majority of the air including large dirt particles and some small dirt particles is sucked into throat opening 48 of dirty air passage tube 46 which extends into connector tube 47 which in turn extends into inlet opening 51 of fourth wedge shaped sub-pre-filter unit 50. Similarly, dirty air 220 enters through inlet opening 51, and a portion is sucked through the pre-filter membrane within sub-pre-filter unit 50 (resulting in clean air which exits at H') and the majority of the air including large dirt particles and some small dirt particles is sucked into throat opening 58 of dirty air passage tube 56 which extends into connector tube 57 which in turn extends into inlet opening 61 of fifth wedge shaped sub-pre-filter unit 60. Similarly, dirty air 220 enters through inlet opening 61, and a portion is sucked through the pre-filter membrane within sub-pre-filter unit 60 (resulting in clean air which exits at J') and the majority of the air including large dirt particles and some small dirt particles is sucked into throat opening 68 of dirty air passage tube 66 which extends into connector tube 67 which in turn extends into inlet opening 71 of sixth wedge shaped sub-pre-filter unit 70. Sixth wedge shaped sub-pre-filter unit 70 does not have the filter membrane assembly but instead extends directly through dirty air passage tube 76 to dirty air outlet opening 78 which in turn extends into dirty air outlet tube 80 which extends into the heavy duty motor and to the vacuum cleaner bag.

Comparable to the illustration in FIG. 3, each of the five sub-pre-filter units illustrated in FIG. 5 has an clean-air outlet opening and tube which extends into an openings connector tube which in turn leads to the lighter powered motor. Specifically, first sub-pre-filter unit 20 has clean-air exit opening 23, second sub-pre-filter unit 30 has clean-air exit opening 33, third sub-pre-filter unit 40 has clean-air exit opening 43, fourth sub-pre-filter unit 50 has clean-air exit opening 53, and fifth sub-pre-filter unit 60 has clean-air exit opening 63. Each of the clean-air exit openings extends via their respective tubes into a central connector tube 90 which in turn leads to the less powerful motor.

Figure 6:
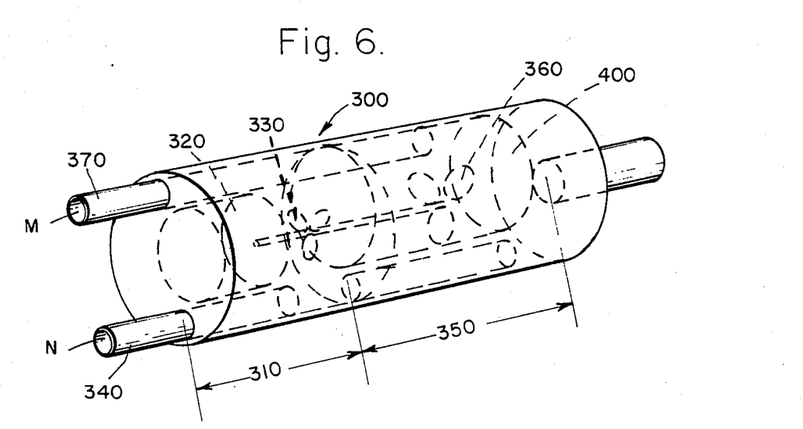
FIG. 6 is a perspective view of a motor assembly to be used with the pre-filter unit embodiment illustrated in FIG. 5, with interior elements shown in dashed lines.

A perspective view of one embodiment of the motor unit 300 is illustrated in FIG. 6. First chamber 310 includes one motor 320 which drives two suction creating fans. In this embodiment, instead of two motors as illustrated in FIG. 2, there is one motor driving fans of different sizes to thereby create the varying suction differential. Also housed in first chamber 310 is smaller suction creating fan 330 whose blades can be one to two inches. Motor inlet passage tube 340 leads from central clean air connector tube 90 into the first chamber 310. Therefore the smaller fan 330 generates the smaller suction to pull air out of the respective pre-filter membranes of the sub-pre-filter units. Second chamber 350 includes larger suction crating fan 360 whose blades can be two to four inches. Motor inlet passage tube 370 leads from dirty air outlet tube 80 into the second chamber 350. Therefore the large fan 360 generates the larger suction to pull the larger dirt particles and some aggregated clumps derived from smaller particulates away from the sub-pre-filter unit membranes by the negative pressure principle previously discussed. The second chamber 350 leads to the vacuum cleaner filter bag 400 which will hold the larger particles without having them entraped in the pores of the larger bag, thereby assuring a longer productive suction from the vacuum cleaner, as previously discussed.

The pre-filter unit of the present invention can be made of any suitable material such as plastic, polyvinyl, or metal. The filter membranes themselves in the pre-filter units can include an conventional material such as fabric mesh.

Defined in more general terms, the present invention is an apparatus for pre-filtering air which comprises large dirt and dust particles and small dirt and dust particles prior to the air entering the bag of a vacuum cleaner, comprising: (a) a multiplicity of pre-filter means wherein each pre-filter means further comprises: (i) a housing having at least one pre-filter membrane therein, (ii) the housing having a dirtyair inlet opening to receive the air to be pre-filtered, (iii) the housing having a clean-air outlet exit connected to a central connector tube, (iv) the housing having a dirty air passage tube having an opening located within the interior housing space surrounded by said at least one pre-filter membrane and exiting the housing through a dirty-air exit opening; (b) each of the clean-air outlet exits of said multiplicity of pre-filter means connected to said central connector tube which in turn is connected to a first source of vacuum suction; (c) a respective dirty-air exit opening from a dirty air passage tube of a respective one pre-filter means connected to the dirty-air inlet opening an an adjacent respective pre-filter means; (d) the last pre-filter means having a dirty-air exit opening from its dirty air passage tube connected to a second source of vacuum suction; (e) a first source of vacuum suction which creates a vacuum through said central connector tube and into the housing of each pre-filter means to thereby create a positive source of vacuum pressure of the air against the retention surface of said at least one pre-filter membrane of each pre-filter means to thereby suck the air to be pre-filtered out of at least one pre-filter means; (f) a second source of vacuum suction which creates a negative source of vacuum pressure through said dirty air passage tube of each pre-filter means and through the means connecting the dirty-air exit of one dirty air passage tube to the dirty-air inlet of an adjacent pre-filter means to thereby create a negative source of vacuum pressure pulling the dirt and particles away from the retention surface of said at least one filter membrane of each pre-filter means to thereby suck the air to be pre-filtered away from the retention surface of said at least one filter membrane of each pre-filter means of through the dirty air passage tubes and connector means which connect one dirty air passage tube to a dirty-air inlet opening of an adjacent pre-filter means; (g) means connecting the flow of air from the second source of vacuum to the bag of the vacuum cleaner; and (h) the suction created by said second source of vacuum being greater than the suction created by said first source of vacuum; (i) whereby the positive pressure suction generated from said first source of vacuum suction causes some air to be drawn out of the dirty air through the pre-filter membrane pores, while the second source of vacuum suction causes the large dirt and dust particles and some small dirt and dust particles to be sucked away from the same pre-filter membrane pores into the vacuum cleaner bag, and to continuously self-clean the pre-filter membranes.

Defined even more broadly, the present invention is an apparatus for pre-filtering air which comprises large dirt and dust particles and small dirt and dust particles prior to the air entering the bag of a vacuum cleaner, comprising: (a) at least one pre-filter means further comprising: (i) a housing having at least one pre-filter membrane therein, (ii) the housing having an inlet opening to receive the air to be pre-filtered. (iii) the housing having an outlet exit connected to a first source of vacuum suction, (iv) the housing having a dirty air passage tube having an opening located within the interior housing space surrounded by said at least one pre-filter membrane and exiting the housing through an opening connected to a second source of vacuum suction; (b) a first source of vacuum suction which creates a positive pressure of the air against the retention surface of said at least one pre-filter membrane to thereby suck the air out of at least one pre-filtered means; (c) a second source of vacuum suction which creates a negative source of vacuum pressure of the air away from the retention surface of said at least one pre-filter membrane to thereby suck the dirty air to be pre-filtered away from the retention surface of said at least one pre-filter membrane and through said dirty air passage tube; (d) means connecting the flow of dirty air from the second source of vacuum to the bag of the vacuum cleaner; and (e) the suction created by said second source of vacuum being greater than the suction created by said first source of vacuum; (f) whereby the positive pressure suction generated from said first source of vacuum suction causes some of the air to be extracted out of at least one pre-filter membrane of the pre-filter means while the second source of vacuum suction causes the large dirt and dust particles and some small dirt and dust particles to be concentrated and aggregated and sucked into the vacuum cleaner bag, and to continuously self-clean the pre-filter membranes.

In addition to being described as an apparatus, the present invention can also be described as a method for pre-filtering the air as follows. The present invention is a method for pre-filtering air which comprises large dirt and dust particles and small dirt and dust particles prior to the air entering the bag of a vacuum cleaner, comprising: (a) generating a first source of suction on the air to cause the air to be sucked onto at least one pre-filter membrane and through the pores of the pre-filter membrane; (b) generating a second source of suction on the air to cause the air containing the dirt and particulate matters to be sucked away from the at least one pre-filter membrane; and (c) the second source of suction being greater than the first source of suction to thereby enable unclogging of the pre-filter membrane while the large dirt and dust particles and some of the small dirt and dust particles are aggregated and caused to travel to the bag of a vacuum cleaner.

The present invention can also be defined as a method for pre-filtering air which comprises large dirt and dust particles and small dirt and dust particles prior to the air entering the bag of a vacuum cleaner, comprising: (a) generating a first source of suction on the air to cause the air to be sucked onto the pre-filter membranes and through the pore of the pre-filter membrane of a multiplicity of pre-filter units; (b) generating a second source of suction on the air to cause the air containing the dirt and particulate matter to be sucked away from the pre-filter membranes of a multiplicity of pre-filter units; and (c) the second source of suction being greater than the first source of suction to thereby enable unclogging of any particles entrapped in the pre-filter membranes while the large dirt and dust particles and some of the small dirt and dust particles are aggregated and caused to travel to the bag of a vacuum cleaner.

Of course the present invention is not intended to be resticted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus for pre-filtering air which comprises large dirt and dust particles and small dirt and dust particles prior to the air entering the bag of a vacuum cleaner, comprising:
  a. at least one pre-filter means further comprising:
    (i) a housing having at least one-pre-filter membrane therein,
    (ii) the housing having an inlet opening to receive the air to be pre-filtered,
    (iii) the housing having an outlet exit connected to a first source of vacuum suction,
    (iv) the housing having a dirty air passage tube having an opening located within the interior housing space surrounded by said at least one pre-filter membrane and exiting the housing through an opening connected to a second source of vacuum suction;

b. a first source of vacuum suction which creates a positive pressure of the air against the retention surface of said at least one pre-filter membrane to thereby suck the air to be pre-filtered through pores of the said at least one pre-filter membrane;

c. a second source of vacuum suction which creates a negative source of vacuum pressure of the air and dirt away from the retention surface of said at least one pre-filter membrane to thereby suck the dirty air and dirt to be pre-filtered away from the retention surface of said at least one pre-filter membrane and through said dirty air passage tube;

d. means connecting the flow of dirty air from the second source of vacuum to the bag of the vacuum cleaner; and e. the suction created by said second source of vacuum being greater than the suction created by said first source of vacuum;

f. whereby the positive pressure suction generated from said first source of vacuum suction causes some of the air to be sucked through the pores of said at least one pre-filter membrane of the pre-filter means while the second source of vacuum suction causes the large dirt and dust particles and some small dirt and dust particles to be aggregated into large particles too large to clog the vacuum cleaner bag, before they are sucked into the vacuum cleaner bag, and to continuously self-clean the pre-filter membranes.

2. An apparatus in accordance with claim 1 wherein:
a. said first source of vacuum suction is an electric motor having a horsepower in the range of one to four; and
b. said second source of vacuum suction is an electric motor having a horsepower in the range of two to ten.

3. An apparatus in accordance with claim 1 wherein said first and second sources of vacuum suction are driven by a single electric motor and said first source of vacuum suction is created by a first fan and said second source of vacuum suction is created by a second fan having blades which are larger than the blades of the first fan.

4. An apparatus in accordance with claim 3 wherein the blades of said first fan are in the size range of one to two inches and the blades of said second fan are in the size range of two to four inches.

5. An apparatus in accordance with claim 1 wherein said at least one pre-filter membrane is made of fabric mesh.

6. An apparatus for pre-filtering air which comprises large dirt and dust particles and small dirt and dust particles prior to the air entering the bag of a vacuum cleaner, comprising:
a. a multiplicity of pre-filter means wherein each pre-filter means further comprises:
   (i) a housing having at least one pre-filter membrane therein,
   (ii) the housing having a dirty air inlet opening to receive the air to be pre-filtered,
   (iii) the housing having a clean air outlet exit connected to a central connector tube,
   (iv) the housing having a dirty air passage tube having an opening located within the interior housing space surrounded by said at least one pre-filter membrane and exiting the housing through a dirty air exit opening;

b. each of the clean air outlet exits of said multiplicity of pre-filter means connected to said central connector tube which in turn is connected to a first source of vacuum suction;

c. a respective dirty air exit opening from a dirty air passage tube of a respective one pre-filter means connected to the dirty air inlet opening an an adjacent respective pre-filter means;

d. the last pre-filter means having a dirty air exit opening from its dirty air passage tube connected to a second source of vacuum suction;

e. a first source of vacuum suction which creates a vacuum through said central connector tube and into the housing of each pre-filter means to thereby create a positive pressure of the air against the retention surface of said at least one pre-filter membrane of each pre-filter means to thereby suck the air to be pre-filtered out of at least one pre-filter means;

f. a second source of vacuum suction which creates a negative source of vacuum pressure through said dirty air passage tube of each pre-filter means and through the means connecting the dirty air exit of one dirty air passage tube to the dirty air inlet of an adjacent pre-filter means to thereby create a negative source of vacuum pressure pulling the dirt and particles away from the retention surface of said at least one pre-filter membrane of each pre-filter means to thereby suck the air and dirt away from the retention surface of said at least one pre-filter membrane of each pre-filter means and through the dirty air passage tubes and connector means which connect one dirty air passage tube to a dirty air inlet opening of an adjacent pre-filter means;

g. means connecting the flow of air from the second source of vacuum to the bag of the vacuum cleaner; and h. the suction created by said second source of vacuum being greater than the suction created by said first source of vacuum;

i. whereby the positive pressure suction generated from said first source of vacuum suction causes some of the air to be sucked out of the pores of said at least one pre-filter membrane of all of the pre-filter means while the second source of vacuum suction causes the large dirt and dust particles and some small dirt and particles to be aggregated before they are sucked into the vacuum cleaner bag, and to continuously self-clean the pre-filter membranes.

7. An apparatus in accordance with claim 6 wherein:
a. said first source of vacuum suction is an electric motor having a horsepower in the range of one to four; and
b. said second source of vacuum suction is an electric motor having a horsepower in the range of two to ten.

8. An apparatus in accordance with claim 6 wherein said first and second sources of vacuum suction are driven by a single electric motor and said first source of vacuum suction is created by a first fan and said second source of vacuum suction is created by a second fan having blades which are larger than the blades of the first fan.

9. An apparatus in accordance with claim 8 wherein the blades of said first fan are in the size range of one to two inches and the blades of said second fan are in the size range of two to four inches.

10. An apparatus in accordance with claim 6 wherein said at least one pre-filter membrane of pre-filter means is made of fabric mesh.

11. A method for pre-filtering air which comprises large dirt and dust particles and small dirt and dust particles prior to the air entering the bag of a vacuum cleaner, comprising:
   a. generating a first source of suction on the air to cause the air to be sucked through at least one pre-filter membrane and out of at least one pre-filter membrane;
   b. generating a second source of suction on the air to cause the air and dirt to be sucked away from the at least one pre-filter membrane; and
   c. the second source of suction being greater than the first source of suction to thereby enable some of the air to be sucked out of the at least one pre-filter membrane while the large dirt and dust particles and some of the small dirt and dust particles aggregated to form large particles which subsequently are caused to travel to the bag of a vacuum cleaner, and to thereby continuously self-clean the pre-filter membranes.

12. A method for pre-filtering air which comprises large dirt and dust particles and small dirt and dust particles prior to the air entering the bag of a vacuum cleaner, comprising:
   a. generating a first source of suction on the air to cause the air to be sucked through the pores of the pre-filter membranes and out of a multiplicity of pre-filter units;
   b. generating a second source of suction on the air to cause the air and dirt to be sucked away from the pre-filter membranes of a multiplicity of pre-filter units; and
   c. the second source of suction being greater than the first source of suction to thereby enable some of the air to be sucked out of the pre-filter membranes while the large dirt and dust particles and some of the small dirt and dust particles aggregate and subsequently are caused to travel to the bag of a vacuum cleaner, and to thereby continuously self-clean the pre-filter membranes.

* * * * *